(12) United States Patent
Mankins

(10) Patent No.: US 7,061,914 B2
(45) Date of Patent: Jun. 13, 2006

(54) SCHEMES FOR DETERMINING WHETHER ALL OF THE FRAGMENTS OF A DATAGRAM ARE RECEIVED

(75) Inventor: David Patrick Mankins, Cambridge, MA (US)

(73) Assignees: Verizon Corporate Services Group Inc., New York, NY (US); BBNT Solutions LLC, Cambridge, MA (US)

( * ) Notice: Subject to any disclaimer, the term of this patent is extended or adjusted under 35 U.S.C. 154(b) by 473 days.

(21) Appl. No.: 10/446,309

(22) Filed: May 28, 2003

(65) Prior Publication Data

US 2004/0243782 A1 Dec. 2, 2004

(51) Int. Cl.
*H04L 12/56* (2006.01)

(52) U.S. Cl. .................. 370/394; 370/392; 370/470; 370/471; 370/472; 370/473; 370/474; 711/170; 711/171; 711/172; 710/34; 710/35

(58) Field of Classification Search ............... 370/392, 370/394, 470–474; 711/170–172; 710/34–35
See application file for complete search history.

(56) References Cited

U.S. PATENT DOCUMENTS 6,650,636 B1 * 11/2003 Bradshaw et al. .......... 370/352
2003/0039249 A1 * 2/2003 Basso et al. ............... 370/394

* cited by examiner

*Primary Examiner*—Donald Sparks
*Assistant Examiner*—Bao Q. Truong
(74) *Attorney, Agent, or Firm*—Leonard C. Suchyta, Esq.

(57) ABSTRACT

Schemes for determining whether all of the fragments of a datagram are received are described herein. The schemes described herein can allocate fifteen bits of memory to one or more counters to facilitate a determination of whether all of the fragments of a datagram are received.

22 Claims, 2 Drawing Sheets

SCHEMES FOR DETERMINING WHETHER ALL OF THE FRAGMENTS OF A DATAGRAM ARE RECEIVED

STATEMENT REGARDING FEDERALLY SPONSORED RESEARCH OR DEVELOPMENT

This application was prepared under government contract number MDA904-02-G-0068 awarded by the Maryland Procurement office. The Government has certain rights in this invention.

BACKGROUND

An Internet Protocol (IP) datagram is a self-contained message unit having payload data and routing data for routing the datagram from a source host to a destination host. A host can otherwise be referred to as a node in a network.

During routing from a source host to a destination host, a datagram can undergo fragmentation and reassembly. Fragmentation refers to the parsing of a datagram into two or more sub-datagrams referred to as fragments. Reassembly refers to the reassembling of the two or more fragments into the datagram.

During reassembly, a node, such as the destination host, can store fragment data and reassembly state records for the one or more datagrams. The reassembly state records can comprise pointers to the fragment data, counts of bytes in the received fragments, and other information about the datagrams.

A variety of schemes are currently available for reassembling IP datagrams. Many of these schemes lack efficiency in their allocation of memory, thereby inhibiting their utility.

SUMMARY

Schemes for determining whether all of the fragments of a datagram are received are described herein. The schemes described herein can allocate fifteen bits of memory to one or more counters to facilitate a determination of whether all of the fragments of a datagram are received.

A method for determining whether, for a datagram fragmented into at least two fragments, the fragments are received is described herein. In one embodiment, the method can comprise allocating memory to a first counter value representing whether a final fragment is received, the first counter value based on more-fragments flags associated with the received fragments, and a second counter value representing receipt of a number of eight byte data units in the received fragments. The method can further comprise, based on the more-fragments flag associated with each received fragment, determining that a received fragment is the final fragment and adjusting the first counter value by one and adjusting the second counter value by the fragment offset of the final fragment or determining that a received fragment is not the final fragment and adjusting the second counter value by the number of eight byte data units comprised in the received fragment. The method can further comprise, based on the first counter value being different than an initial first counter value and the second counter value being equal to an initial second counter value, determining whether the fragments are received.

In one aspect, allocating can comprise allocating fifteen bits of memory.

In one aspect, adjusting the first counter value can comprise one of incrementing the first counter value by one and decrementing the first counter value by one.

In one aspect, adjusting the second counter value by the fragment offset of the final fragment can comprise one of incrementing the second counter value by the fragment offset and decrementing the second counter value by the fragment offset.

In one aspect, adjusting the second counter value by the number of eight byte data units comprised in the at least one fragment can comprise one of incrementing the second counter value by the number of eight byte data units comprised in the at least one fragment and decrementing the second counter value by the number of eight byte data units comprised in the at least one fragment.

In one aspect, the initial second counter value can comprise $2^{13}$.

In one aspect, the second counter can comprise a sign. The initial second counter value can comprise zero.

A processor program for determining whether, for a datagram fragmented into at least two fragments, the fragments are received is described herein. In one embodiment, the processor program can comprise instructions to cause a processor to allocate memory to a first counter value representing whether a final fragment is received, the first counter value based on more-fragments flags associated with the received fragments, and a second counter value representing receipt of a number of eight byte data units in the received fragments. The processor program can further comprise instructions to cause a processor to, based on the more-fragments flag associated with each received fragment, determine that a received fragment is the final fragment and adjust the first counter value by one and adjust the second counter value by the fragment offset of the final fragment or determine that a received fragment is not the final fragment and adjust the second counter value by the number of eight byte data units comprised in the received fragment. The processor program can further comprise instructions to cause a processor to, based on the first counter value being different than an initial first counter value and the second counter value being equal to an initial second counter value, determine whether the fragments are received.

A system for determining whether, for a datagram fragmented into at least two fragments, the at least two fragments are received is described herein. In one embodiment, the system can comprise a first counter comprising a first counter value representing whether a final fragment is received, the first counter value based on more-fragments flags associated with the received fragments, a second counter comprising a second counter value representing receipt of a number of eight byte data units in the received fragments, and a digital data processing device in communication with the first counter and the second counter. The digital data processing device can be capable of, based on the more-fragments flag associated with each received fragment, determining that a received fragment is the final fragment and adjusting the first counter value by one and adjusting the second counter value by the fragment offset of the final fragment or determining that a received fragment is not the final fragment and adjusting the second counter value by the number of eight byte data units comprised in the received fragment. The digital data processing device can be further capable of, based on the first counter value being different than an initial first counter value and the second counter value being equal to an initial second counter value, determining whether the at least two fragments have been received.

These and other features of the schemes described herein can be more fully understood by referring to the following detailed description and accompanying drawings.

DETAILED DESCRIPTION

Figure 1:
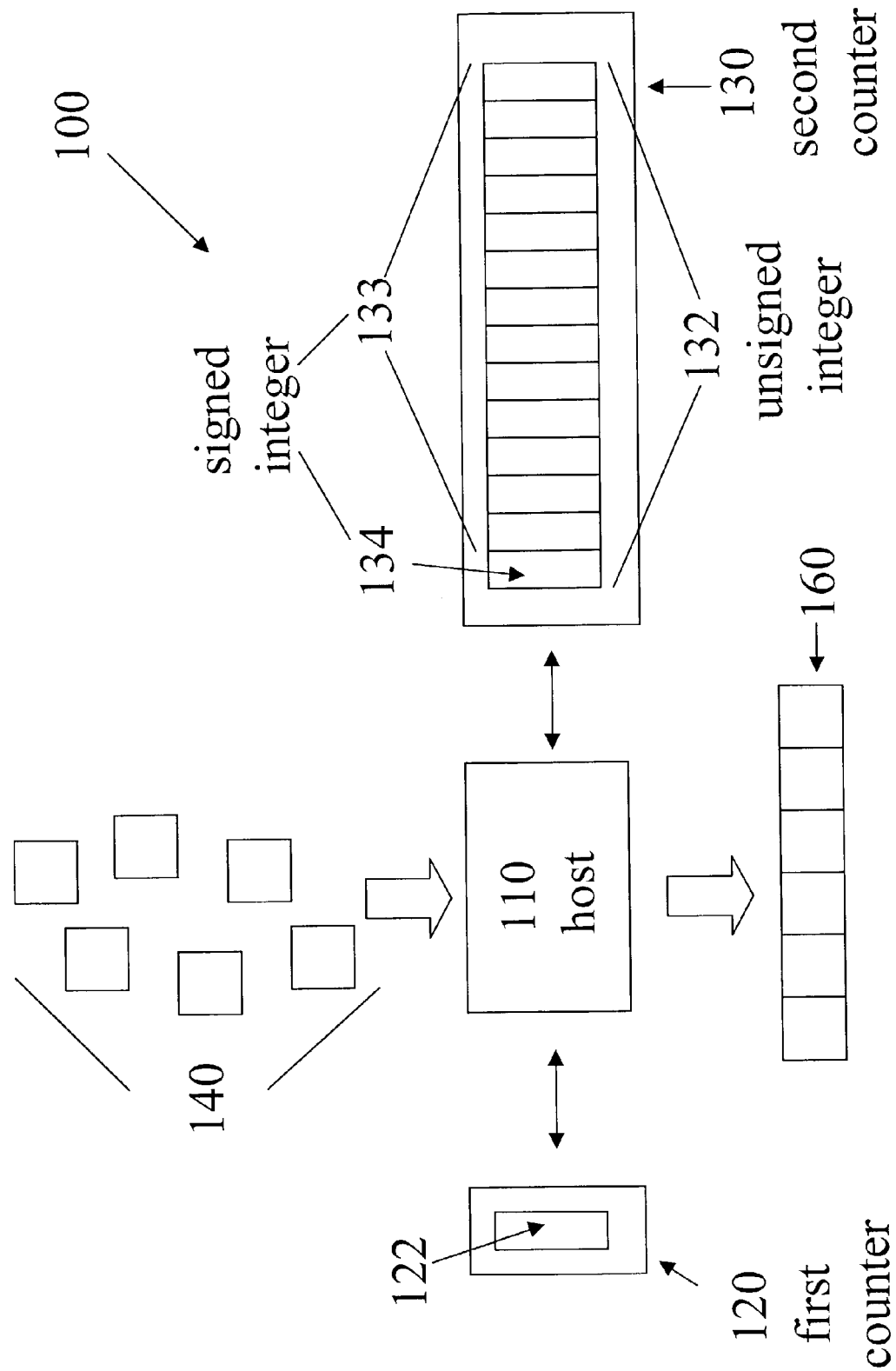
FIG. 1 schematically illustrates an exemplary scheme for determining whether all of the fragments of a datagram are received.

Generally, the schemes described herein allocate fifteen bits of memory to one or more counters to facilitate a determination of whether all of the fragments of a datagram are received. For example, a reassembly scheme can commence after all of the fragments are received, although applications of the schemes described herein are not limited to reassembly schemes. In one embodiment, the schemes described herein can allocate one bit of memory to a first counter and fourteen bits of memory to a second counter. The first counter can represent whether the final fragment of a datagram is received. The second counter can have a sign bit and can represent a number (e.g. a signed integer) of eight byte data units in the fragments received for the datagram. The values of the first and second counters can facilitate a determination of whether all of the fragments of the datagram are received.

Illustrative embodiments will now be described to provide an overall understanding of the schemes for determining whether all of the fragments of a datagram are received. One or more examples of the illustrative embodiments are shown in the drawings. Those of ordinary skill in the art will understand that the schemes described herein can be adapted and modified to provide devices, methods, schemes, and systems for other applications, and that other additions and modifications can be made to the schemes described herein without departing from the scope of the present disclosure. For example, aspects, components, features, and/or modules of the illustrative embodiments can be combined, separated, interchanged, and/or rearranged to generate other embodiments. Such modifications and variations are intended to be comprised within the scope of the present disclosure.

FIG. 1 schematically illustrates an exemplary scheme for receiving fragments of, for example, an IP datagram in which fifteen bits of memory are allocated to two counters to facilitate a determination of whether all of the fragments of the datagram are received. As shown in FIG. 1, the exemplary scheme 100 can comprise a digital data processing device 110 (e.g. a host or a node) that can communicate with a first counter 120 and a second counter 130 to reassemble two or more fragments 140 into a datagram 160. As described herein, the host 110 can reassemble the fragments 140 based on the first and second counters 120, 130.

Figure 2:
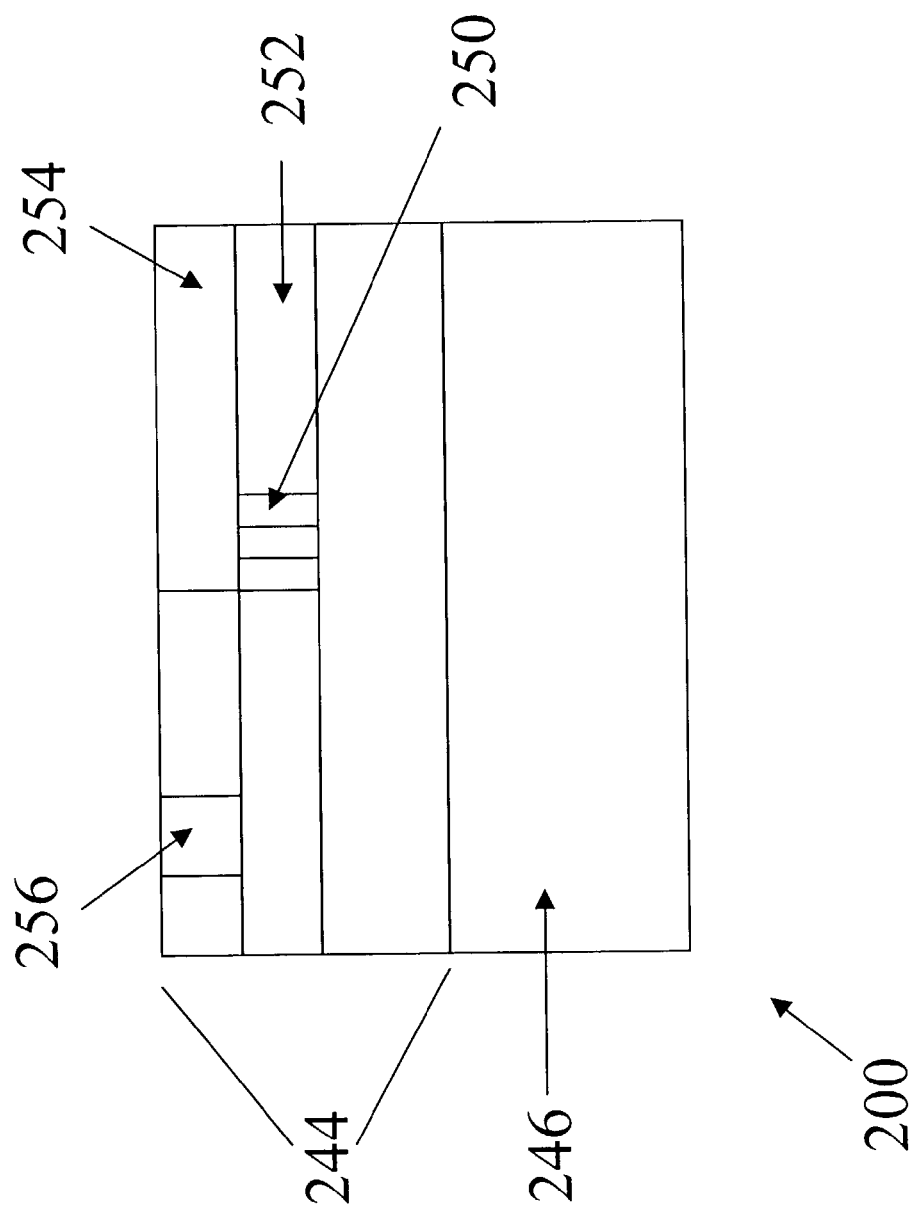
FIG. 2 schematically illustrates a structure of one IP datagram.

As will be understood by those of ordinary skill in the art, the fragments 140 and the datagram 160 shown in FIG. 1 can have varying structures. FIG. 2 schematically illustrates the structure of one IP datagram 200. As shown in FIG. 2, the datagram 200 can comprise data 246 and a header 244 comprising a more-fragments flag 250, a thirteen-bit fragment offset 252, a sixteen-bit total length 254, and a header length 256. The more-fragments flag 250 and the fragment offset 252 can indicate a relative position of a fragment with respect to other fragments of a datagram. In one embodiment, a fragment having a more-fragments flag 250 of zero is the final fragment in the datagram. The fragment offset 252 can represent the offset in units of eight bytes between the start of the data of the datagram and the data of the fragment. In one embodiment, a fragment having a fragment offset 252 of zero is the first fragment of the datagram. The header length 256 can represent the number of words in units of 32 bits forming the header 244. The total length 254 can represent the total length in units of bytes of the datagram 200 and can comprise the header length 256 and the length of the data 246. As will be understood by those of ordinary skill in the art, the schemes described herein are not limited to a datagram structure and can be used with datagram structures different than those described herein.

With reference now to FIG. 1, in the exemplary scheme 100, the first counter 120 can represent whether the final fragment of a datagram is received. For the discussion herein, a "final" fragment can be understood to be the last fragment formed in a fragmentation scheme. As shown in FIG. 1, the first counter 120 can comprise a numerical value 122 to which one bit of memory can be allocated.

With continuing reference to FIG. 1, in the exemplary scheme 100, the second counter 130 can represent a number of eight byte data units in the fragments received for a datagram. As will be understood by those of ordinary skill in the art, the number of eight byte data units comprised in a fragment can be determined based on the difference between the total length of the fragment and the header length of the fragment.

Two different embodiments of the second counter 130 are shown in FIG. 1. In one embodiment, the second counter 130 can comprise an unsigned numerical value 132 to which fourteen bits of memory can be allocated. In such an embodiment, the numerical value 132 can be initialized to $2^{13}$. In another embodiment, the second counter 130 can comprise a signed integer 133, 134 comprising a numerical value 133 to which thirteen bits of memory can be allocated and a sign 134 to which one bit of memory can be allocated. In such an embodiment, the numerical value 133 can be initialized to zero. In both embodiments, the second counter 130 can be adjusted positively and negatively with respect to its initial value.

As shown in FIG. 1, in a reassembly embodiment, the host 110 can reassemble the fragments 140 into a datagram 160 based on the first and second counters 120, 130. The host 110 can comprise a personal computer, a computer workstation (e.g., Sun, Hewlett-Packard), a laptop computer, a server computer, a mainframe computer, a handheld device (e.g., a personal digital assistant, a Pocket Personal Computer, a cellular telephone, etc.), an information appliance, and/or another type of generic or special-purpose, processor-controlled device capable of receiving, processing, and/or transmitting digital data. A processor can refer to the logic circuitry that responds to and processes instructions that drive the host 110 and can comprise, without limitation, a central processing unit, an arithmetic logic unit, an application specific integrated circuit, a task engine, and/or combinations, arrangements, or multiples thereof. The first and second counters 120, 130 can be embodied in one or more programmable (e.g. an electrically erasable programmable read-only memory (EEPROM)), volatile (e.g. a random-access memory (RAM), a cache, etc.,) and/or non-volatile (e.g. a hard drive, etc.) memory elements communicatively coupled to the host 110.

Illustrative operations of the exemplary scheme 100 for determining whether all of the fragments of a datagram are received will now be described. The illustrative operations describe a reassembly of a datagram 160 based on the fragments 140. Those of ordinary skill in the art will understand that the schemes described herein can be used to reassemble the fragments of one or more datagrams simultaneously and can be used in applications other than reassembly.

As shown in FIG. 1, an illustrative operation of the exemplary scheme 100 can begin when the host 110 receives one of the fragments 140. For the exemplary embodiments that comprise a reassembly scheme, a reassembly timer can be started based on receiving a fragment associated with a datagram. If the reassembly timer expires before all of the fragments have been received, the fragments associated with the datagram can be discarded.

In one illustrative operation, the second counter 130 can comprise a 13-bit numerical value 133 initialized to zero and a one-bit sign 134, and the first counter 120 can comprise a one-bit numerical value 122 initialized to zero.

In such an illustrative operation, the host 110 can process a received fragment 140 based on the following schemes. For a received fragment 140, the host 110 can determine whether the fragment 140 is the final fragment of the datagram 160. For a final fragment, the host 110 can increment the numerical value 122 of the first counter 120 by one and can increment the numerical value 133 of the second counter 130 by the fragment offset of the final fragment. For a non-final fragment, the host 110 can decrement the numerical value 133 of the second counter 130 by the number of eight byte data units in the fragment 140 and can adjust the sign 134 of the second counter 130 accordingly. Based on the numerical value 133 of the second counter 130 being zero and the numerical value 122 of the first counter 120 being one, the host 110 can determine that all of the fragments of the datagram are received.

In another illustrative operation, the second counter 130 can comprise a 14-bit numerical value 132 initialized to $2^{13}$, and the first counter 120 can comprise a one-bit numerical value 122 initialized to zero.

In such an illustrative operation, the host 110 can process a received fragment based on the schemes previously described. Based on the numerical value 132 of the second counter 130 being $2^{13}$ and the numerical value 122 of the first counter 120 being one, the host 110 can determine that all of the fragments of the datagram are received.

The host 110 can process a received fragment based on schemes different than those described herein. For example, in one embodiment, the host 110 can decrement the numerical value 132, 133 by the fragment offset of the final fragment and can increment the numerical value 132, 133 by the number of eight byte data units in the received non-final fragments, rather than incrementing and decrementing the numerical value 132, 133 as previously described. Also for example, in one embodiment, the host 110 can initialize the numerical value 122 to one, rather than zero. In such an embodiment, the host 110 can decrement the numerical value by one based on receiving a final fragment.

As previously described herein, the exemplary scheme 100 can allocate fifteen bits of memory to two counters to facilitate a determination of whether all of the fragments of a datagram are received. Alternatively, the schemes described herein can allocate the fifteen bits of memory to one, two, or more than two counters for determining whether all of the fragments of a datagram are received. For example, in one embodiment, the schemes described can allocate the fifteen bits to three counters, in which a first counter can represent whether a final fragment is received, a second counter can represent a number of eight-byte data units in the received fragments, and a third counter can represent a sign of the second counter. Generally, based on the numerical value 132 or 133 being equal to its initial value and the numerical value 122 being different than its initial value, the host 110 can determine that all of the fragments of a datagram are received.

The schemes described herein are not limited to a hardware or software configuration; they can find applicability in many computing or processing environments. The schemes can be implemented in hardware or software, or in a combination of hardware and software. The schemes can be implemented in one or more computer programs, in which a computer program can be understood to comprise one or more processor-executable instructions. The computer programs can execute on one or more programmable processors, and can be stored on one or more storage media readable by the processor, comprising volatile and non-volatile memory and/or storage elements.

The computer programs can be implemented in high level procedural or object oriented programming language to communicate with a computer system. The computer programs can also be implemented in assembly or machine language. The language can be compiled or interpreted.

The computer programs can be stored on a storage medium or a device (e.g., compact disk (CD), digital video disk (DVD), magnetic disk, internal hard drive, external hard drive, random access memory (RAM), redundant array of independent disks (RAID), or removable memory device) that is readable by a general or special purpose programmable computer for configuring and operating the computer when the storage medium or device is read by the computer to perform the schemes described herein.

While the schemes described herein have been shown and described with reference to the shown embodiments, those of ordinary skill in the art will recognize or be able to ascertain many equivalents to the embodiments described herein by using no more than routine experimentation. Such equivalents are intended to be encompassed by the scope of the present disclosure and the appended claims.

For example, the schemes described herein have been shown and described with reference to reassembly of IP datagrams. The schemes described herein are not limited to a datagram structure or a reassembly scheme and can be used with datagrams having different structures and in schemes other than reassembly.

Accordingly, the appended claims are not to be limited to the embodiments described herein, can comprise practices other than those described, and are to be interpreted as broadly as allowed under prevailing law.

The invention claimed is:

1. A method for determining whether, for a datagram fragmented into at least two fragments, the at least two fragments are received, the method comprising:

allocating memory to a first counter value representing whether a final fragment is received, the first counter value based on more-fragments flags associated with the received at least two fragments, and a second counter value representing receipt of a number of eight byte data units in the received at least two fragments, based on the more-fragments flag associated with each received fragment, determining that a received fragment is the final fragment and adjusting the first counter value by one and adjusting the second counter value by the fragment offset of the final fragment, or determining that a received fragment is not the final fragment and adjusting the second counter value by the number of eight byte data units comprised in the received fragment, and based on the first counter value being different than an initial first counter value and the second counter value being equal to an initial second counter value, determining whether the at least two fragments are received.

2. The method of claim 1, wherein allocating comprises allocating fifteen bits of memory.

3. The method of claim 1, wherein adjusting the first counter value comprises one of:
incrementing the first counter value by one, and
decrementing the first counter value by one.

4. The method of claim 1, wherein adjusting the second counter value by the fragment offset of the final fragment comprises one of:
incrementing the second counter value by the fragment offset, and
decrementing the second counter value by the fragment offset.

5. The method of claim 1, wherein adjusting the second counter value by the number of eight byte data units comprised in the at least one fragment comprises one of:
incrementing the second counter value by the number of eight byte data units comprised in the at least one fragment, and
decrementing the second counter value by the number of eight byte data units comprised in the at least one fragment.

6. The method of claim 1, wherein the initial second counter value comprises $2^{13}$.

7. The method of claim 1, wherein the second counter comprises a sign.

8. The method of claim 7, wherein the initial second counter value comprises zero.

9. A processor program for determining whether, for a datagram fragmented into at least two fragments, the at least two fragments are received, the processor program stored on a processor readable medium and comprising instructions to cause a processor to:
allocate memory to
a first counter value representing whether a final fragment is received, the first counter value based on more-fragments flags associated with the received at least two fragments, and
a second counter value representing receipt of a number of eight byte data units in the received at least two fragments,
based on the more-fragments flag associated with each received fragment,
determine that a received fragment is the final fragment and adjust the first counter value by one and adjust the second counter value by the fragment offset of the final fragment, or
determine that a received fragment is not the final fragment and adjust the second counter value by the number of eight byte data units comprised in the received fragment, and
based on the first counter value being different than an initial first counter value and the second counter value being equal to an initial second counter value, determine whether the at least two fragments are received.

10. The processor program of claim 9, wherein the instructions to allocate comprise instructions to allocate fifteen bits of memory.

11. The processor program of claim 9, wherein the instructions to adjust the first counter value comprise one of:
instructions to increment the first counter value by one, and
instructions to decrement the first counter value by one.

12. The processor program of claim 9, wherein the instructions to adjust the second counter value by the fragment offset of the final fragment comprise one of:
instructions to increment the second counter value by the fragment offset, and
instructions to decrement the second counter value by the fragment offset.

13. The processor program of claim 9, wherein the instructions to adjust the second counter value based on the number of eight byte data units comprised in the fragment comprise one of:
instructions to increment the second counter value by the number of eight byte data units comprised in the at least one fragment, and
instructions to decrement the second counter value by the number of eight byte data units comprised in the at least one fragment.

14. The processor program of claim 9, wherein the initial second counter value comprises $2^{13}$.

15. The processor program of claim 9, wherein the second counter comprises a sign.

16. The processor program of claim 15, wherein the initial second counter value comprises zero.

17. A system for determining whether, for a datagram comprising at least two fragments, the at least two fragments are received, the system comprising
a first counter comprising a first counter value representing whether a final fragment is received, the first counter value based on more-fragments flags associated with the received at least two fragments,
a second counter comprising a second counter value representing receipt of a number of eight byte data units in the received at least two fragments, and
a digital data processing device in communication with the first counter and the second counter, the digital data processing device capable of:
based on the more-fragments flag associated with each received fragment,
determining that a received fragment is the final fragment and adjusting the first counter value by one and adjusting the second counter value by the fragment offset of the final fragment, or
determining that a received fragment is not the final fragment and adjusting the second counter value by the number of eight byte data units comprised in the received fragment, and
based on the first counter value being different than an initial first counter value and the second counter value being equal to an initial second counter value, determining whether the at least two fragments have been received.

18. The system of claim 17, wherein the first counter comprises one bit of memory and the second counter comprises fourteen bits of memory.

19. The system of claim 17, wherein the digital data processing device is capable of incrementing and decrementing the first and second counter values.

20. The system of claim 17, wherein the initial second counter value comprises $2^{13}$.

21. The system of claim 17, wherein the second counter comprises a sign.

22. The system of claim 21, wherein the initial second counter value comprises zero.

* * * * *